FIG. 1
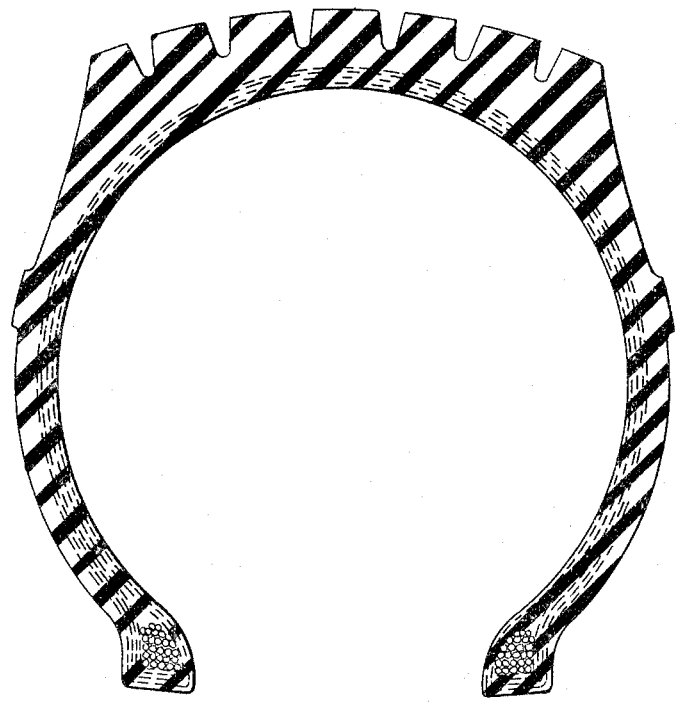
FIG. 2
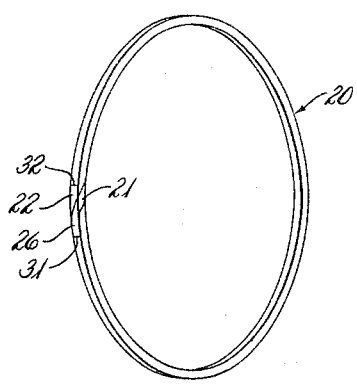
FIG. 3
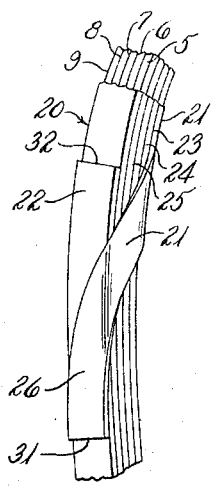
FIG. 4
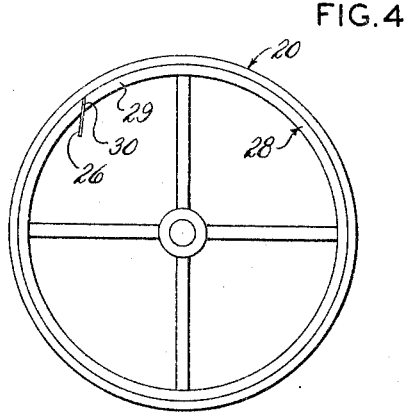
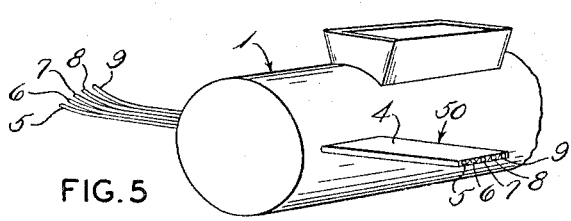
FIG. 5

United States Patent Office 3,269,444
Patented August 30, 1966

3,269,444
TIRE BEAD CONSTRUCTION COMPRISING
TERPOLYMERS
James M. Willis, Akron, Ohio, assignor to The Firestone Tire & Rubber Company, Akron, Ohio, a corporation of Ohio.
Filed Apr. 27, 1964, Ser. No. 362,863
5 Claims. (Cl. 152—362)

The present invention relates, as indicated, to improved tire beads, and more particularly to a construction and composition of the inextensible portion of such beads.

It is common practice in the manufacture of pneumatic straight side tires to provide the bead portions of the tire with substantially inextensible wire grommets usually formed of a high carbon steel wire which wire is desirably brass plated. The wire forming said grommets is often fashioned into flat ribbons of "braided" wire which are run through a rubber insulating machine whereby a cover and webbing of rubber is formed about and between the wires. More usually, however, the wires are webbed and insulated in parallel groups of 5 to 6 wires. The ribbons are then wound continuously convolutely upon themselves through 5 or 6 revolutions. Another method of forming the grommets is to insulate a single wire by passing it through a rubber insulating machine and then to wind the insulated wire continuously on a bead building ring until a sufficient number of convolutions has been obtained to provide the tensile strength desired in each grommet.

The present invention is concerned primarily with grommets formed by passing a number of closely equally spaced single parallel wires in the same plane through a rubber insulating machine forming a coating of rubber about and between the wires thereby forming a flat ribbon. The ribbon is wound flat, upon itself, upon a bead building ring until the body of the grommet is built up to a tensile strength required. This method is clearly described in Patent No. 2,882,141, to which reference may be had.

It has been found that certain "EPT" rubber compositions have given excellent adhesive coaction with standard bead wire stocks allowing the production of tires of better durability, and particularly with tires formed from EPT rubber, butyl rubber or mixtures of EPT and butyl rubber. One of the principal characteristics of the rubber stock composition of the present invention is that sufficient sulfur is provided in the rubber batch used to form the insulation about and between the spaced parallel wires, to form an improved bond between the metal and the rubber. The rubber compositions of the present invention are also characterized by the presence therein of a filler material such as a clay, hydrated silica, hydrated clay, etc., alone or in combination with a highly reinforcing carbon black which improves again the adhesive characteristics between the rubber and the bead wire.

High tearing strength or adhesion characteristic is further enhanced by control of the accelerators to give a more even or level cure.

Briefly, it has been found that wire grommet rubber stock which are characterized by polymer units derived from ethylene and propylene, and more particularly by the presence of polymer units derived from ethylene, propylene, and a non-conjugated diene such as, for example, dicyclopentadiene, 2-methylene norbornene, and 1,4-hexadiene exhibit a particularly unique coaction between conventional tire bead wire materials conferring upon tire bead portions formed from inextensible wire grommet materials, properties which enhance the over-all characteristics of a tire formed therefrom or including the same.

The amount of the non-conjugated diene in the terpolymer may range between .5% and 5% by weight.

To the accomplishment of the foregoing and related ends, said invention, then, consists of the means hereinafter fully described and particularly pointed out in the appended claims, the following description and annexed drawings setting forth in detail certain illustrative embodiments of the invention, such disclosed means constituting, however, but a few of the various forms in which the principle of this invention may be employed.

The invention may be better understood by having reference to the annexed drawings wherein:

FIG. 1 is a sectional view taken in a radial plane of a tire embodying wire grommets in the bead portion thereof, which wire grommets are produced in accordance with the present invention.

FIG. 2 is a view in perspective of a completed grommet or annulus of reinforcement embodying the present invention.

FIG. 3 is a fragmentary view of FIG. 2 drawn to a larger scale and showing a portion of the grommet shown in FIG. 2 with rubber coating removed from the wire of a portion thereof.

FIG. 4 is a side elevational view of a wire grommet building ring or form showing a ribbon of insulated bead wire wound thereon.

FIG. 5 is a diagrammatical view illustrating a plurality of bead wires passing through a wire insulating machine and emerging covered with rubber in ribbon form.

In FIG. 1 there is provided a pneumatic tire generally indicated at 10 and comprised of a rubberized fabric body portion 11 terminating at its two edges in two inextensible bead portions 12 and 13. A rubbery tread portion 14 is superimposed and bonded as by vulcanization to reinforced fabric portion 11, and rubbery side walls 15 and 16 extend from respective edges of the tread portion 14 along the fabric body 11 to which they are bonded, to the bead portions 12 and 13. A fabric formed of tire cord and indicated by dotted lines identified with the number 17 may be formed from conventional nylon cord, or a cord formed from other synthetic or naturally occurring fibrous materials, e.g. cotton. Specifically, the cord portion may be formed in the manner described in Patent No. 2,991,818 wherein the cord 17 is a reinforcing element for the rubber body portion 11 and formed from 3 strands. Each strand is composed of two filament yarns twisted to hold them in the desired shape. Where the tire is constructed of 4 plies of rubberized fabric, the nylon cord fabric used therein is conventionally an 840/2 nylon cord fabric. The number 840 denotes the denier of the nylon filament whereas the number 2 denotes the number of yarns of 840 denier twisted together to form a cord.

Referring to the drawings in detail, it will be seen by reference to FIGS. 2 and 3 that a grommet referred to generally at 20, comprises 5 plies; namely, an inside ply 21, an outside ply 22 and intermediate plies 23, 24 and 25. These plies consist of a continuous ribbon 50 which in the present illustration is composed of 5 parallel wires 5, 6, 7, 8 and 9, best shown in FIG. 5 which lie in the ribbon in the same plane and are covered with a coating of rubber 4 commonly referred to as insulating. The ribbon 50 is formed as illustrated in FIG. 5 by leading the wires from supply reels, not shown, to and through a rubber insulating machine referred to generaly as 1, thereby coating the wires with rubber and forming ribbon 50 all as will be understood by those familiar with the art. This rubberized wire ribbon is variously referred to in the tire industry as wire braid, tape or ribbon.

The grommet 20 is formed by winding a continuous length of the ribbon 50 upon a wire grommet building ring 28 as will be seen by reference to FIG. 4. The insulating rubber 4 at the time of winding or plying up of grommet 20 is unvulcanized and is sufficiently tacky to adhere to itself which permits the handling of the grommet 20 in its unvulcanized state without separation of the convolutions of the ribbon.

In accordance with the teachings of Patent No. 2,822,141, the base portion 29 of the building ring 28 is provided with a slot 30. The first step in winding or plying up the grommet is to insert the beginning end portion 26 of the ribbon which is to be wound upon the form in slot 30 permitting the length of ribbon to extend radially inwardly of the slot to provide a length of ribbon sufficient to be turned angularly radially outwardly across the side over and against the radial outer surface of the finished grommet so that the end 31 of the ribbon will terminate on the outside surface of the grommet. With the end portion 26 of the tape in slot 30, the winding is continuous until, in the present illustration, 5 plies of the ribbon have been built up and end 31 of the ribbon terminates a distance beyond the end 32 when end 31 is in its final position as shown in FIG. 2. Building ring 28 is provided with a radially outwardly extending flange against which one edge of the ribbon is brought into contact during the winding operation resulting in the edges of the plies, the convolutions of the ribbon being wound evenly except for end portions 26. The base 29 of the ring 28 is wider than the width of the ribbon so that the slot 30 is spaced axially away from the flange 33 a sufficient distance to offset the portion 26 of the ribbon that is extended through the slot 30 from the main body of the grommet to facilitate the turning of the portion 26 of the ribbon above the body of the grommet as shown in FIG. 3.

Upon completion of the winding of the wire grommet 20 it is removed from the building form 28 after which it may be built directly into a tire to form the inextensible member of the tire beads, or it may be covered with fabric and have bead flippers attached or given any other treatment found desirable as a matter of tire construction before it is built into the tire.

The wires forming the inextensible reinforcing element 5-9 are conventional bead wire materials, preferably brass plated, which wires have undergone no special pretreatment prior to coating with the preferred rubber compositions of the present invention.

As indicated above, the elastomeric material from which the ribbon 50 is formed is characterized by the presence therein of polymer units derived from ethylene and propylene, and more especially, polymer units derived from ethylene, propylene, and a non-conjugated diene, such as dicyclopentadiene. In a typical "EPT" rubber, the proportions of ethylene, propylene, and dicyclopentadiene, for example, are in a weight ratio of 50:50:3.

A preferred batch formulation for the rubber material used for forming the ribbon 50 is as follows:

EXAMPLE 1

| | Parts |
| --- | --- |
| Ethylene-propylene-dicyclopentadiene terpolymer | 100 |
| Carbon black (MT Black) | 20 |
| High abrasion furnace black | 50 |
| Rubber maker's clay | 40 |
| Medium process oil | 20 |
| Stearic acid | 1 |
| Zinc oxide | 5 |
| Sulfur | 2 |
| Tetramethyl thiuram monosulfide | 1 |
| Mercaptobenzothiazole | 1 |

Additional specific examples of EPT compositions and cold and hot adhesion results on the Standard Pull Test for bead wires are given in Table I below.

*Table I.—Ethylene-propylene terpolymer bead stocks*

| | | | | | | | | | |
| --- | --- | --- | --- | --- | --- | --- | --- | --- | --- |
| EPT (1)[1] | 100 | | | | | | | | |
| EPT (2)[1] | | 100 | | | | | | | |
| EPT (3)[1] | | | 100 | | | 100 | | | |
| EPT (4)[1] | | | | 100 | | | 100 | 100 | 100 |
| EPT (5)[1] | | | | | 100 | | | | |
| High Abrasion Furnace Black | 50 | 50 | 50 | 50 | 50 | 50 | 20 | 50 | 50 |
| Medium Thermal Black | 20 | 20 | 20 | 20 | 20 | 20 | 25 | 20 | 20 |
| Hard Clay (Rubber Maker's) | 40 | 40 | 40 | 40 | 40 | 40 | 65 | 40 | 40 |
| Medium Processing Oil | 20 | 20 | 20 | 20 | 20 | 20 | 5 | 20 | 20 |
| Stearic Acid | 1 | | | | | | | | |
| Zinc Oxide | 5 | 5 | 5 | 5 | 5 | 5 | 5 | 5 | 5 |
| Sulfur | 2.0 | 2.0 | 2.0 | 2.0 | 2.0 | 3.0 | 1.5 | 2.0 | 2.0 |
| Tetramethylthiuram Disulphide | | 1.5 | 1.0 | 1.0 | 1.0 | 1.0 | 1.5 | 1.0 | 1.5 |
| Mercaptobenzothiazol | | 0.5 | 0.5 | 0.5 | 0.5 | 0.5 | 0.5 | 0.5 | 0.5 |
| Tellurium Dimethyldithiocarbamate | 1.0 | | | | | | | | |
| 2,2'-dithiobis (benzothiazole) | 1.0 | | | | | | | | |
| Total | 240.0 | 239.0 | 238.5 | 238.5 | 238.5 | 239.5 | 223.5 | 238.5 | 239.0 |
| Adhesion to bare wire, lbs./in.: | | | | | | | | | |
| 73° F | | 66.8 | 67.7 | 66.8 | | 79.1 | 62.3 | 66.8 | 61.1 |
| 212° F | 56.5 | 41.1 | 41.4 | 35.7 | | 36.2 | 38.9 | 35.7 | 21.3 |

[1] Numerals in parentheses indicate different commercial examples of ethylene-propylene terpolymers.

In the preceding Table I, EPT Examples 1, 2 and 3 are ethylene/propylene/dicyclopentadiene terpolymers in which the monomers are in a weight ratio of about 67:33:5.3, respectively. Example 4 is an ethylene-propylene/1,4-hexadiene terpolymer in which the monomers are in a weight ratio of 62:38:4.2. Example 5 is an ethylene/propylene/2-methylene-5-norbornene terpolymer in which the monomers are in a weight ratio of 55:45:4.7. In general, the weight ratio of the ethylene to the propylene is in the range of from 70:30 to 30:70, respectively. The amount of unsaturation (—C=C—) is generally in the range of from 0.5% to about 5.0%. The amount of unsaturation affects the cure rate and should be in the higher concentrations for lower Mooney rubbers, and in the lower concentration for higher Mooney rubbers.

A tire having a cross section such as that shown in FIG. 1 and formed from a wire grommet formed in the manner above described, or as described in United States Patent No. 2,822,141 and vulcanized into a tire, shows excellent adhesion to the rim, freedom from slipping between the tire rim and the tire bead, improved durability, etc.

There has thus been provided an improved tire bead forming material in the form of a webbing of spaced parallel high carbon wires, particularly brass coated high carbon steel wire which have in insulating and spacing relationship therewith a rubber material characterized by the presence therein of polymer units derived from ethylene and propylene, and more particularly polymer units derived from ethylene, propylene, and a non-conjugated diene.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. In a pneumatic tire bead grommet comprising a plurality of layers of a single ribbon of rubber insulated wire having end portions, said ribbon being wound flat upon itself in several convolutions forming a bundle thereof, the improvement which comprises a rubber composition including polymer units derived from ethylene, propylene, and a non-conjugated diene, the propylene being used in amounts from about 30 to 70 mole percent, the rubber having an adhesion to bare wire of between about 10 and 100 pounds per inch at 73° F. and between about 10 and 100 pounds per inch at 212° F.

2. An improved pneumatic tire bead grommet in accordance with claim 1 wherein the non-conjugated diene is dicyclopentadiene.

3. A composite inextensible reinforcing element including a plurality of wire reinforcing elements embedded in an elastomeric composition including polymer units derived from ethylene, propylene and a non-conjugated diene, the propylene being used in amounts of from about 30 to 70 mole percent, the elastomeric composition having an adhesion to bare wire of from about 10 to 100 pounds per inch at 73° F. and being from about 10 to 100 pounds per inch at 212° F.

4. A composite inextensible reinforcing element in accordance with claim 3 wherein said wire reinforcing elements are disposed in parallel relation to each other.

5. A composite inextensible reinforcing element in accordance with claim 4 wherein said wire reinforcing elements total 5 in number, said wire reinforcing elements being disposed in the same plane and equally spaced from one another, said wires being embedded in a ribbon of said elastomeric composition, and said ribbon being convolutely wound upon its own spiral form to provide a wire grommet.

References Cited by the Examiner
UNITED STATES PATENTS
2,822,141  2/1958  Robson _____ 245—65
3,162,620  12/1964  Gladding _____ 260—80.7 X

FOREIGN PATENTS
879,808  10/1961  Great Britain.

References Cited by the Applicant
UNITED STATES PATENTS
2,933,480  4/1960  Gresham.
2,975,159  3/1961  Weinmayr.
3,000,866  9/1961  Tarney.

FOREIGN PATENTS
804,083  11/1958  Great Britain.

OTHER REFERENCES
"Chemical Week," Nov. 24, 1962, pp. 67–73.
"Rubber Age," November 1963, pp. 255–267.
"Rubber Age," column 94, No. 3, December 1963, pp. 427–437.

ARTHUR L. LA POINT, *Primary Examiner.*

C. W. HAEFELE, *Assistant Examiner.*